US012595532B2

(12) United States Patent
(10) Patent No.: US 12,595,532 B2
(45) Date of Patent: Apr. 7, 2026

Xu et al.

(54) ORE HYDROMETALLURGICAL SLAG AND PHOSPHATING SLAG

(71) Applicants: PT QMB NEW ENERGY MATERIALS, Jakarta (ID); PT ESG NEW ENERGY MATERIAL, Jakarta (ID); GEM CO., LTD., Shenzhen (CN); PT GEM INDONESIA NEW ENERGY MATERIALS, Jakarta (ID)

(72) Inventors: Kaihua Xu, Shenzhen (CN); Satryo Soemantri Brodjonegoro, Jakarta (ID); Andi Syaputra Hasibuan, Jakarta (ID); Emil Salim, Jakarta (ID); Rizky Wanaldi, Jakarta (ID); Xiaodong Yan, Jakarta (ID); Tegar Mukti Aji, Jakarta (ID); Piyan Rahmadi, Jakarta (ID)

(73) Assignees: PT QMB NEW ENERGY MATERIALS, Jakarta (ID); PT ESG NEW ENERGY MATERIAL, Jakarta (ID); GEM CO., LTD., Shenzhen (CN); PT GEM INDONESIA NEW ENERGY MATERIALS, Jakarta (ID)

( * ) Notice: Subject to any disclaimer, the term of this patent is extended or adjusted under 35 U.S.C. 154(b) by 20 days.

(21) Appl. No.: 18/870,447

(22) PCT Filed: Jul. 28, 2023

(86) PCT No.: PCT/CN2023/109906

§ 371 (c)(1),
(2) Date: Nov. 29, 2024

(87) PCT Pub. No.: WO2025/024980

PCT Pub. Date: Feb. 6, 2025

(65) Prior Publication Data

US 2026/0002231 A1 Jan. 1, 2026

(51) Int. Cl.
*C22B 7/04* (2006.01)
*C01B 25/30* (2006.01)
(Continued)

(52) U.S. Cl.
CPC ................ *C22B 7/04* (2013.01); *C01B 25/30* (2013.01); *C01B 25/45* (2013.01); *C01F 7/20* (2013.01);
(Continued)

(58) Field of Classification Search
None
See application file for complete search history.

(56) References Cited

FOREIGN PATENT DOCUMENTS

CN 102424426 A * 4/2012

OTHER PUBLICATIONS

Fang, Dong et al. "Recycling SiO 2 and Al 2 O 3 from the Laterite Nickel Slag in Molten Sodium Hydroxides." (2018). (Year: 2018).*
(Continued)

*Primary Examiner* — Keith Walker
*Assistant Examiner* — Catherine P Smith
(74) *Attorney, Agent, or Firm* — Hemisphere Law, PLLC

(57) ABSTRACT

Disclosed is a combined treatment method for laterite nickel ore hydrometallurgical slag and phosphating slag, the combined treatment method includes uniformly mixing a laterite nickel ore hydrometallurgical slag, a phosphating slag, and a sodium alkaline salt to obtain a mixed material; subjecting the mixed material to sodium reduction roasting to obtain a roasted material; leaching the roasted material with water and filtering to obtain a water leaching solution and a water leaching slag; subjecting the water leaching slag to magnetic separation to obtain an iron concentrate. In the disclosure, by mixing a laterite nickel ore hydrometallurgical slag and a phosphating slag and then performing sodium reduction roasting, the iron exists in the form of $Fe_3O_4$ and elements
(Continued)

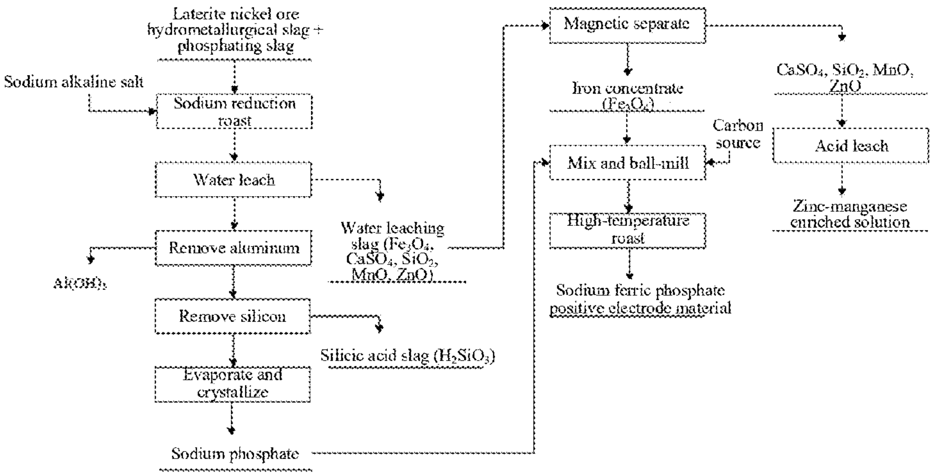

such as manganese and zinc exist in the slag in the form of oxides, and during the roasting process, aluminum oxides react with alkali to be converted into sodium aluminate.

15 Claims, 1 Drawing Sheet

(51) Int. Cl.
*C01B 25/45* (2006.01)
*C01F 7/20* (2006.01)
*C01G 49/08* (2006.01)
*C22B 3/00* (2006.01)

(52) U.S. Cl.
CPC .......... *C01G 49/08* (2013.01); *C01P 2006/80* (2013.01); *C22B 23/0407* (2013.01)

(56) References Cited

OTHER PUBLICATIONS

CN 102424426 A English Machine translation (Year: 2012).*
Claims of PCT/CN2023/109906.
CNIPA (ISA), Written opinion for PCT/CN2023/109906, Nov. 20, 2023.

* cited by examiner

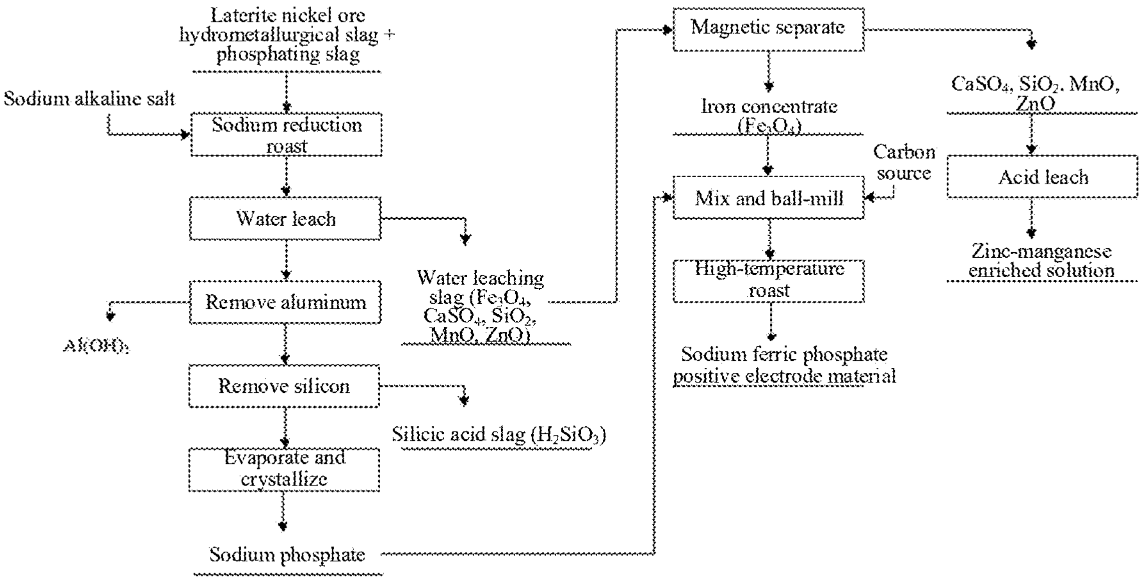
Laterite nickel ore hydrometallurgical slag + phosphating slag
Sodium alkaline salt
Sodium reduction roast
Water leach
Remove aluminum
Al(OH)3
Remove silicon
Evaporate and crystallize
Sodium phosphate
Water leaching slag (Fe3O4, CaSO4, SiO2, MnO, ZnO)
Silicic acid slag (H2SiO3)
Magnetic separate
Iron concentrate (Fe3O4)
Carbon source
Mix and ball-mill
High-temperature roast
Sodium ferric phosphate positive electrode material
CaSO4, SiO2, MnO, ZnO
Acid leach
Zinc-manganese enriched solution

ORE HYDROMETALLURGICAL SLAG AND PHOSPHATING SLAG

FIELD OF THE DISCLOSURE

The disclosure relates to the technical field of hydrometallurgy, and in particular to a combined treatment method for laterite nickel ore hydrometallurgical slag and phosphating slag.

BACKGROUND

With the rapid development of the new energy industry, nickel as the supporting metal of the new energy industry, and its mineral resources have been widely studied. As the main nickel mineral resource, laterite nickel ore has attracted more and more attention in its hydrometallurgical process. In the hydrometallurgical process of laterite nickel ore, a large amount of hydrometallurgical slag is produced, in which iron oxide is one of the main components of the slag phase. CN113279048B discloses a method for preparing high-purity iron phosphate from an iron-containing slag, and the patent uses the iron-containing slag and high-concentration phosphoric acid as raw materials to prepare high-purity iron phosphate. Although this patent is capable of converting laterite nickel ore iron-containing slag to high-purity iron phosphate, it requires the use of large quantities of high-concentration phosphoric acid and the subsequent recovery of the phosphoric acid is extremely cumbersome.

A large amount of phosphating slag is produced in the phosphating process of the electroplating industry, and the main components of phosphating slag produced in the zinc-manganese phosphating process are zinc phosphide, manganese phosphide, and so on. Chinese patent CN102593450B discloses a method for preparing multi-doped lithium iron phosphate using phosphating waste slag as a main raw material, which achieves a high-value utilization of converting phosphating waste slag into lithium iron phosphate, but it needs to remove elements in phosphating waste slag which have adverse effects on the electrochemical performance of lithium iron phosphate by acid washing, thereby causing a large amount of iron loss.

If the laterite nickel ore hydrometallurgical slag and phosphating slag can be treated cooperatively, it can not only realize the efficient recovery of iron and phosphorus in the laterite nickel ore hydrometallurgical slag and phosphating slag but also simplify the process and avoid the use of high concentration phosphoric acid. Therefore, it is necessary to provide a combined treatment method for laterite nickel ore hydrometallurgical slag and phosphating slag and to prepare a sodium ferric phosphate positive electrode material based on the method, so as to improve the added value of solid waste.

SUMMARY

The object of the disclosure is to overcome the above-mentioned technical deficiencies and propose a combined treatment method for laterite nickel ore hydrometallurgical slag and phosphating slag, so as to solve the technical problems of the prior art that the separate treatment steps of the laterite nickel ore hydrometallurgical slag and the phosphating slag are complicated and the loss of iron is large.

The disclosure provides a combined treatment method for laterite nickel ore hydrometallurgical slag and phosphating slag, including the steps:

raw material mixing: uniformly mixing a laterite nickel ore hydrometallurgical slag, a phosphating slag, and a sodium alkaline salt to obtain a mixed material;

sodium reduction roasting: subjecting the mixed material to sodium reduction roasting to obtain a roasted material;

water leaching: leaching the roasted material with water and filtering to obtain a water leaching solution and a water leaching slag;

magnetic separation: performing magnetic separation on the water leaching slag to obtain an iron concentrate; wherein, in the sodium reduction roasting step, the roasting temperature is 500-1000° C., the roasting time is 1~4 h, and the roasting atmosphere is a reducing gas.

Advantageous effects of the disclosure compared with the prior art include:

In the disclosure, by mixing a laterite nickel ore hydrometallurgical slag and a phosphating slag and then performing sodium reduction roasting, and by controlling the roasting temperature and the roasting time, excessive reduction of iron can be effectively avoided, ensuring that iron exists in the form of $Fe_3O_4$ and at the same time ensuring that elements such as manganese and zinc exist in the slag in the form of oxides, and in the roasting process, the aluminum oxide in the slag reacts with alkali to be converted into sodium aluminate which is readily soluble in water, and then an efficient separation of aluminum in the roasted material can be achieved by a simple water leaching process; at the same time, zinc phosphide and manganese phosphide react with alkali to convert into sodium phosphate and corresponding oxides, which will also promote the conversion of iron oxides from non-magnetic to magnetic, and the subsequent simple magnetic separation process can achieve efficient recovery of iron. The disclosure achieves efficient separation and recovery of iron and phosphorus from waste slags by synergistically disposing of both slags.

BRIEF DESCRIPTION OF THE DRAWING

FIGURE is a process flowchart of one embodiment of a combined treatment method for laterite nickel ore hydrometallurgical slag and phosphating slag provided by the disclosure.

DETAILED DESCRIPTION OF PREFERRED EMBODIMENTS

In order that the objects, aspects, and advantages of the disclosure will become more apparent, a more particular description of the disclosure will be rendered by reference to the embodiments thereof which are illustrated in the appended drawing. It should be understood that the particular embodiments described herein are illustrative only and are not limiting.

Referring to FIGURE, the disclosure provides a combined treatment method for laterite nickel ore hydrometallurgical slag and phosphating slag, comprising the steps:

step S1, raw material mixing: uniformly mixing a laterite nickel ore hydrometallurgical slag, a phosphating slag, and a sodium alkaline salt to obtain a mixed material;

step S2, sodium reduction roasting: subjecting the mixed material to sodium reduction roasting to obtain a roasted material;

step S3, water leaching: leaching the roasted material with water and filtering to obtain a water leaching solution and a water leaching slag; and step S4, magnetic separation: performing magnetic separation on the water leaching slag to obtain an iron concentrate; in the magnetic separation step, the magnetic part is an iron concentrate, the main component is $Fe_3O_4$, and other impurity elements are less than 0.5%; the non-magnetic fraction is a mixture of zinc oxide, manganese oxide, gypsum, and silica.

The principle of the disclosure is as follows: the main composition of laterite nickel ore hydrometallurgical slag is iron oxide, aluminum oxide, calcium sulfate, and silicon dioxide, and the main composition of phosphating slag is zinc phosphide, manganese phosphide, and silicon dioxide. In the sodium reduction roasting step, the reduction route of the iron oxide in the waste slag is $Fe_2O_3$—$Fe_3O_4$—FeO—Fe; in the disclosure, by mixing the laterite nickel ore hydrometallurgical slag and the phosphating slag and then performing sodium reduction roasting, and by controlling the roasting temperature and the roasting time, the excessive reduction of iron can be effectively avoided; iron is reduced to a metal in preference to manganese and zinc, ensuring that the iron exists in the form of $Fe_3O_4$ and at the same time ensuring that elements such as manganese and zinc exist in the slag in the form of oxide; and in the roasting process, the aluminum oxide in the slag reacts with alkali to change into sodium aluminate which is readily soluble in water. The high-efficiency separation of aluminum from roasted material can be achieved by a simple water leaching process, and the Al content in the water leaching slag can be reduced to less than 0.05%; at the same time, zinc phosphide and manganese phosphide react with alkali to convert into sodium phosphate and corresponding oxides, which will also promote the conversion of iron oxides from non-magnetic to magnetic, and the subsequent simple magnetic separation process can achieve efficient recovery of iron. The disclosure achieves efficient separation and recovery of iron and phosphorus from waste slags by synergistically disposing of both slags. The partial reactions are as follows:

$$MnP + 10.5Fe_2O_3 + 3NaOH = MnO + 7Fe_3O_4 + Na_3PO_4 + 1.5H_2O$$

$$Zn_3P_2 + 24Fe_2O_3 + 6NaOH = 3ZnO + 2Na_3PO_4 + 3H_2O + 16Fe_3O_4$$

In the embodiment, the composition of the laterite nickel ore hydrometallurgical slag comprises: Fe 38-40%, Al 5-7%, Si 8-10%, Ca 5-8%, and the other metal elements Ni, Co, Zn, Mg, etc. are all below 0.1%; the composition of the ingredients of the phosphating slag comprises: Zn 15-18%, Mn 10-12, Fe 2-3%, Ca 7-10%, Si 6-8%, P 12-15%, and the other metal elements are all below 0.1%.

In the embodiment, in step S1, the mass ratio of the laterite nickel ore hydrometallurgical slag to the phosphating slag is 1:(0.5-5), including but not limited to 1:0.5, 1:1, 1:2, 1:3, 1:4, 1:5, etc.

In the present embodiment, in step S1, the sodium alkaline salt is one or more of sodium hydroxide or sodium carbonate; the mass ratio of laterite nickel ore hydrometallurgical slag to sodium alkaline salt is 1:(1-5), including but not limited to 1:1, 1:2, 1:3, 1:4, 1:5, etc.

In the embodiment, in step S2, the roasting temperature is 500-1000° C., including but not limited to 500° C., 600° C., 700° C., 800° C., 900° C., 1000° C., etc.; the roasting time is 1~4 h, including but not limited to 1 h, 1.5 h, 2 h, 2.5 h, 3 h, 4 h, etc.; the roasting atmosphere is a reducing gas, such as one or several mixed gases of $H_2$, $CH_4$, CO, etc.; the disclosure does not limit the roasting atmosphere, and a person skilled in the art would have been able to make a selection according to actual situations; the roasting process is carried out in a muffle furnace.

In the embodiment, in step S3, room temperature leaching is used, the solid-to-liquid ratio is 100-300 g/L, including but not limited to 100 g/L, 150 g/L, 200 g/L, 250 g/L, 300 g/L, etc. and the water leaching time is 0.5-3 h, including but not limited to 0.5 h, 1 h, 1.5 h, 2 h, 2.5 h, 3 h, etc.

In the embodiment, in step S4, the magnetic separation is performed by a magnetic separator having a magnetic field strength of 10000-15000 GS, including but not limited to 10000 GS, 11000 GS, 12000 GS, 13000 GS, 14000 GS, 15000 GS, etc. and a feeding rate of 0.5-1 t/h, including but not limited to 0.5 t/h, 0.6 t/h, 0.7 t/h, 0.8 t/h, 0.9 t/h, 1 t/h, etc.

In the embodiment, after the end of step S3, further comprising step S5 of removing aluminum and silicon and evaporating and crystallizing: removing aluminum, removing silicon, and evaporating and crystallizing the water leaching solution successively to obtain sodium phosphate. Efficient recovery of phosphorus can be achieved by sequential precipitation, removing aluminum, removing silicon, and evaporating and crystallizing of the water leaching solution. After the process for removing aluminum and removing silicon according to the disclosure, the concentrations of aluminum and silicon ions in the silicon-removed solution are both below 1 ppm, and the purity of sodium phosphate obtained by evaporating and crystallizing the silicon-removed solution is above 99.5%.

Wherein the process of removing aluminum comprises: adjusting the pH of the water leaching solution to 5-8, including but not limited to 5, 6, 7, 8, etc. and filtering to obtain $Al(OH)_3$ and an aluminum-removed solution; further, in the process of removing aluminum, the acid used for adjusting the pH is phosphoric acid, and the disclosure does not limit the concentration of phosphoric acid, and a person skilled in the art would have been able to make a selection according to actual situations; the process of removing silicon comprises: adjusting the pH of the aluminum-removed solution to 1-2, including but not limited to 1, 1.2, 1.4, 1.6, 1.8, 2, etc. and performing a heating reaction, followed by filtering to obtain a silicic acid slag and a silicon-removed solution; further, in the process of removing silicon, the acid used for adjusting the pH is phosphoric acid, and the disclosure does not limit the concentration of phosphoric acid, and a person skilled in the art would have been able to make a selection according to actual situations; the temperature of the heating reaction is 50-100° C., including but not limited to 50° C., 60° C., 70° C., 80° C., 90° C., 100° C., etc. and the time of the heating reaction is 0.5-3 h, including but not limited to 0.5 h, 1 h, 1.5 h, 2 h, 2.5 h, 3 h, etc.; the process of evaporating and crystallizing comprises: subjecting the silicon-removed solution to evaporating and crystallizing to obtain sodium phosphate. Further, in the process of evaporating and crystallizing, the silicon-removed solution is evaporated at 70-90° C., including but not limited to 70° C., 75° C., 80° C., 85° C., 90° C., etc. until the relative density is 1.2-1.3 g/$cm^3$ to end the evaporation, and the solution is cooled to 15-25° C. to precipitate sodium phosphate crystals.

In the embodiment, after finishing step S4, further comprising step S6, preparation of a sodium ferric phosphate positive electrode material: subjecting the iron concentrate obtained in step S4 and the sodium phosphate obtained in step S5 to mixing and ball-milling, followed by high-temperature roasting to obtain the sodium ferric phosphate positive electrode material. The inventors have unexpectedly discovered during disposal that the recovered iron and phosphorus can be directly used for regeneration to produce a higher value-added sodium positive electrode material, sodium iron phosphate, which improves the resource utilization of laterite nickel ore hydrometallurgical slag and phosphating slag.

Wherein in step S6, a regulator may also be added to regulate the proportion of P so that the molar ratio of Fe:Na:P in the mixture is 1:(0.96-1):(1-1.1). Further, the regulator is ammonium dihydrogen phosphate, diammonium hydrogen phosphate or sodium carbonate, etc. and the disclosure is not limited thereto, and a person skilled in the art would have been able to make a selection according to actual situations.

In step S6, a carbon source may also be added in the process of ball-milling and mixing. The conductivity of sodium iron phosphate can be enhanced by adding a carbon source and reducing the ferric iron in the iron concentrate to ferrous iron. Further, the carbon source is one or more of starch, glucose, or sucrose, and the carbon source comprises 5-10% of the total mass of sodium phosphate, iron concentrate, and regulator, including but not limited to 5%, 6%, 7%, 8%, 9%, 10%, etc.

Wherein in step S6, in the process of high-temperature roasting, the roasting temperature is 650-850° C., including but not limited to 650° C., 700° C., 750° C., 800° C., 850° C., etc.; the roasting time is 10-20 h, including but not limited to 10 h, 12 h, 14 h, 16 h, 18 h, 20 h, etc.; the roasting atmosphere is an inert atmosphere.

In the embodiment, after the end of step S4, further comprising step S7, acid leaching: the zinc and manganese in the non-magnetic fraction are selectively leached with an inorganic acid to obtain a zinc-manganese enriched solution and a zinc-manganese removed slag, wherein the obtained zinc-manganese removed slag can be used for brick making, and the zinc-manganese enriched solution can be subjected to subsequent treatment using existing conventional means.

Wherein the inorganic acid is a common inorganic acid, such as sulfuric acid and the like, and the disclosure is not limited thereto; in the acid leaching process, the concentration of the inorganic acid is 0.5-2 mol/L, including but not limited to 0.5 mol/L, 1 mol/L, 1.5 mol/L, 2 mol/L, etc.; the temperature is 50-80° C., including but not limited to 50° C., 60° C., 70° C., 80° C., etc. and the time is 1-3 h, including but not limited to 1 h, 1.5 h, 2 h, 2.5 h, 3 h, etc.; the solid-to-liquid ratio is from 50 to 200 g/L, including but not limited to 50 g/L, 100 g/L, 150 g/L, 200 g/L, etc. Through the above-mentioned acid leaching process, the zinc and manganese slags in the slag after leaching are all less than 0.1%.

To avoid redundancy, in the following examples and comparative examples of the disclosure, the composition of the laterite nickel ore hydrometallurgical slag and the phosphating slag is as follows:

The composition of the laterite nickel ore hydrometallurgical slag is Fe 39.59%, Al 5.82%, Si 8.64%, Ca 6.88%, and the other metal elements Ni, Co, Zn, Mg, etc. are all below 0.1%; the main composition of phosphating slag is: Zn 16.74%, Mn 11.65, Fe 2.13%, Ca 9.57%, Si 7.50%, P 14.25%, the other metal elements were all below 0.1%.

Example 1

(1) Raw material mixing: the laterite nickel ore hydrometallurgical slag, the phosphating slag, and the sodium hydroxide were uniformly mixed in a mass ratio of 1:1:3 to obtain a mixed material;

(2) sodium reduction roasting: the mixed material was placed in a muffle furnace, and a reducing gas $H_2$ was introduced to perform sodium reduction roasting. After the roasting was finished, a roasted material was obtained; wherein the roasting temperature was 800° C. and the roasting time was 2 h;

(3) water leaching: the roasted material was leached with water, the solid-to-liquid ratio was controlled to 200 g/L, leached by water at room temperature and stirred for 1 h, and then filtered to obtain the water leaching solution and water leaching slag; the content of aluminum in the water leaching slag is less than 0.05%;

(4) removing aluminum and silicon, evaporating and crystallizing: dilute phosphoric acid was added to the water leaching solution to adjust the pH to 7, and then filtered and precipitated to obtain aluminum hydroxide and aluminum-removed solution. Dilute phosphoric acid was continued to be added to the aluminum-removed solution to adjust the pH to 1.5, and the temperature was controlled at 80° C. After reacting for 0.5 h, the silicon-removed solution and silicic acid slag were obtained by filtration. The concentrations of aluminum and silicon ions in the silicon-removed solution were both below 1 ppm. The silicon-removed solution was then evaporated at 80±2° C. The evaporation was terminated when the relative density of the solution was 1.25±0.2 g/cm$^3$, and the solution was cooled to 20±2° C. to precipitate sodium phosphate crystals ($Na_3PO_4 \cdot 12H_2O$) with a purity of 99.87%.

(5) Magnetic separation: the water leaching slag was subjected to magnetic separation, the magnetic field strength was controlled at 12000 GS, the feeding rate was 0.5 t/h, the $Fe_3O_4$ content in the obtained iron concentrate was 99.73%, the impurity element content was less than 0.3%, and the $Fe_3O_4$ yield was 99.59%;

(6) preparation of sodium iron phosphate positive electrode material: the obtained sodium phosphate and iron concentrate were proportioned, wherein ammonium dihydrogen phosphate was used to adjust the phosphorus ratio so that the molar ratio of Na: Fe: P in the mixture was 1:1:1, and glucose was added as a carbon source at 5% of the mass of the mixture for high-temperature reduction roasting. The inert atmosphere was controlled, the roasting temperature was 750° C., and the roasting time was 12 h to obtain $NaFePO_4/C$ positive electrode material. The $NaFePO_4/C$ cathode material was used to prepare a battery, and the electrochemical performance was tested. The first charge capacity was 142.5 mAh/g and the first discharge capacity was 140.3 mAh/g at 0.1 C, indicating that the positive electrode material has good electrochemical performance.

(7) Acid leaching: the non-magnetic fraction slag after magnetic separation was subjected to an acid leaching process, with a sulfuric acid concentration of 1 mol/L, leaching solid-to-liquid ratio of 100 g/L, leaching temperature of 70° C., leaching time of 1 h, and the zinc and manganese element contents in the filtered residue were both less than 0.1%. The filtrate was a zinc-manganese enriched solution and can be treated by existing conventional technical means.

Examples 2-5

Examples 2-5 demonstrated the effect of roasting temperature in the sodium reduction roasting step on the $Fe_3O_4$ content and yield in the iron concentrate obtained in the magnetic separation step. The only difference compared to Example 1 is that in the sodium reduction roasting step, the roasting temperature is different. The test results are shown in Table 1.

TABLE 1

| | Roasting temperature (° C.) | Content of $Fe_3O_4$ in iron concentrate (%) | Total yield of $Fe_3O_4$ (%) |
|---|---|---|---|
| Example 2 | 400 | 68.81 | 65.25 |
| Example 3 | 600 | 96.66 | 95.57 |
| Example 1 | 800 | 99.73 | 99.59 |
| Example 4 | 1000 | 99.85 | 99.22 |
| Example 5 | 1200 | 53.64 | 50.68 |

Examples 6-9

Examples 6-9 demonstrated the effect of roasting time in the sodium reduction roasting step on the $Fe_3O_4$ content and yield in the iron concentrate obtained in the magnetic separation step. The only difference compared to Example 1 is that in the sodium reduction roasting step, the roasting time is different. The test results are shown in Table 2.

TABLE 2

| | Roasting time (h) | Content of $Fe_3O_4$ in iron concentrate (%) | Total yield of $Fe_3O_4$ (%) |
|---|---|---|---|
| Example 6 | 0.5 | 38.68 | 35.75 |
| Example 7 | 1 | 89.27 | 87.66 |
| Example 1 | 2 | 99.73 | 99.59 |
| Example 8 | 3 | 99.82 | 99.63 |
| Example 9 | 4 | 90.94 | 88.28 |

Comparative Example 1

Compared to Example 1, the only difference is that: (1) raw material mixing: the laterite nickel ore hydrometallurgical slag, the phosphating slag, and the sodium hydroxide were uniformly mixed in a mass ratio of 1:0:3 to obtain a mixed material; The remaining steps are consistent with Example 1 and are not repeated here.

By the method of Comparative Example 1, the iron concentrate obtained in the magnetic separation step had a $Fe_3O_4$ content of 70.33% and a $Fe_3O_4$ yield of 68.55%.

The particular embodiments of the disclosure described above are not to be construed as limiting the scope of the disclosure. It is intended that the disclosure cover the modifications and variations of this invention provided they come within the scope of the appended claims and their equivalents.

What is claimed is:

1. A combined treatment method for laterite nickel ore hydrometallurgical slag and phosphating slag, comprising the following steps:

raw material mixing: uniformly mixing a laterite nickel ore hydrometallurgical slag, a phosphating slag, and a sodium alkaline salt to obtain a mixed material;

sodium reduction roasting: subjecting the mixed material to sodium reduction roasting to obtain a roasted material;

water leaching: leaching the roasted material with water and filtering to obtain a water leaching solution and a water leaching slag;

magnetic separation: subjecting the water leaching slag to magnetic separation to obtain an iron concentrate; wherein, in the sodium reduction roasting step, the roasting temperature is 500-1000° C., the roasting time is 1~4 h, and the roasting atmosphere is a reducing gas.

2. The combined treatment method for laterite nickel ore hydrometallurgical slag and phosphating slag according to claim 1, wherein the composition of the laterite nickel ore hydrometallurgical slag comprises: Fe 38-40%, Al 5-7%, Si 8-10%, Ca 5-8%, and the other metal elements are all below 0.1%; the composition of the phosphating slag comprises: Zn 15-18%, Mn 10-12%, Fe 2-3%, Ca 7-10%, Si 6-8%, P 12-15%, and the other metal elements are all below 0.1%.

3. The combined treatment method for laterite nickel ore hydrometallurgical slag and phosphating slag according to claim 1, wherein in the raw material mixing step, the mass ratio of the laterite nickel ore hydrometallurgical slag to the phosphating slag is 1:(0.5-5).

4. The combined treatment method for laterite nickel ore hydrometallurgical slag and phosphating slag according to claim 1, wherein in the raw material mixing step, the sodium alkaline salt is one or more of sodium hydroxide or sodium carbonate, and the mass ratio of the laterite nickel ore hydrometallurgical slag to the sodium alkaline salt is 1:(1-5).

5. The combined treatment method for laterite nickel ore hydrometallurgical slag and phosphating slag according to claim 1, wherein in the sodium reduction roasting step, the roasting temperature is 600-1000° C. and the roasting time is 1-3 h.

6. The combined treatment method for laterite nickel ore hydrometallurgical slag and phosphating slag according to claim 1, wherein in the water leaching step, room temperature leaching is used, the solid-to-liquid ratio is 100-300 g/L, and the water leaching time is 0.5-3 h.

7. The combined treatment method for laterite nickel ore hydrometallurgical slag and phosphating slag according to claim 1, wherein in the magnetic separation step, the magnetic separation is performed by a magnetic separator, the magnetic field strength is 10000-15000 GS, and the feeding rate of the magnetic separation is 0.5-1 t/h.

8. The combined treatment method for laterite nickel ore hydrometallurgical slag and phosphating slag according to claim 1, wherein after the water leaching step is finished, the method further comprises a step of removing aluminum and silicon, evaporating and crystallizing: removing aluminum, removing silicon and evaporating and crystallizing the water leaching solution successively to obtain sodium phosphate; wherein, the process of removing aluminum comprises: adjusting the pH of the water leaching solution to 5-8, and filtering to obtain $Al(OH)_3$ and an aluminum-removed solution;

the process of removing silicon comprises: adjusting the pH of the aluminum-removed solution to 1-2, and performing a heating reaction, followed by filtration to obtain a silicic acid slag and a silicon-removed solution;

the process of evaporating and crystallizing comprises: subjecting the silicon-removed solution to evaporating and crystallizing to obtain sodium phosphate.

9. The combined treatment method for laterite nickel ore hydrometallurgical slag and phosphating slag according to claim 8, wherein the acid used for adjusting the pH in the process of removing aluminum and removing silicon is phosphoric acid; in the process of removing silicon, the temperature of the heating reaction is 50-100° C., and the time of the heating reaction is 0.5-3 h; in the process of evaporating and crystallizing, the silicon-removed solution is evaporated at 70-90° C. until the relative density is 1.2-1.3 g/cm$^3$ to end the evaporation, and the solution is cooled to 15-25° C. to precipitate sodium phosphate crystals.

10. The combined treatment method for laterite nickel ore hydrometallurgical slag and phosphating slag according to claim 8, wherein after the magnetic separation is finished, the method further comprises a preparation step of a sodium ferric phosphate positive electrode material: subjecting the iron concentrate obtained by magnetic separation and the sodium phosphate obtained by evaporating and crystallizing to mixing and ball-milling, followed by high-temperature roasting to obtain the sodium ferric phosphate positive electrode material.

11. The combined treatment method for laterite nickel ore hydrometallurgical slag and phosphating slag according to claim 10, wherein in the preparation step of the sodium ferric phosphate positive electrode material, a regulator is added to regulate the proportion of P so that the molar ratio of Fe:Na:P in the mixture is 1:(0.96-1):(1-1.1).

12. The combined treatment method for laterite nickel ore hydrometallurgical slag and phosphating slag according to claim 11, wherein in the preparation step of the sodium ferric phosphate positive electrode material, a carbon source is also added in the process of ball-milling and mixing; wherein, the carbon source is one or more of starch, glucose, or sucrose, and the carbon source accounts for 5-10% of the total mass of the sodium phosphate, the iron concentrate, and the regulator.

13. The combined treatment method for laterite nickel ore hydrometallurgical slag and phosphating slag according to claim 10, wherein in the preparation step of the sodium ferric phosphate positive electrode material, in the process of high-temperature roasting, the roasting temperature is 650-850° C., the roasting time is 10-20 h, and the roasting atmosphere is an inert atmosphere.

14. The combined treatment method for laterite nickel ore hydrometallurgical slag and phosphating slag according to claim 1, wherein after the magnetic separation is finished, the method further comprises an acid leaching step: the zinc and manganese in the non-magnetic fraction being selectively leached with inorganic acid to obtain zinc-manganese enriched solution and zinc-manganese removed slag.

15. The combined treatment method for laterite nickel ore hydrometallurgical slag and phosphating slag according to claim 14, wherein in the acid leaching step, the concentration of the inorganic acid is 0.5-2 mol/L, the temperature is 50-80° C., the time is 1-3 h, and the solid-to-liquid ratio is 50-200 g/L.

* * * * *